(12) United States Patent
Hu et al.

(10) Patent No.: US 7,811,962 B2
(45) Date of Patent: Oct. 12, 2010

(54) MANUFACTURE OF EXHAUST ARTICLES FOR INTERNAL COMBUSTION ENGINES

(75) Inventors: Zhicheng Hu, Edison, NJ (US); Patrick L. Burk, Freehold, NJ (US); Shau-Lin F. Chen, Piscataway, NJ (US); Harold N. Rabinowitz, Upper Montclair, NJ (US); Christopher M. Minnella, Middlesex, NJ (US); Aaron N. Israel, Hoboken, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/183,365

(22) Filed: Jul. 31, 2008

(65) Prior Publication Data
US 2009/0042722 A1    Feb. 12, 2009

Related U.S. Application Data

(60) Continuation of application No. 11/752,633, filed on May 23, 2007, now abandoned, which is a division of application No. 09/968,192, filed on Oct. 1, 2001, now Pat. No. 7,276,212.

(51) Int. Cl.
B01J 23/10    (2006.01)
(52) U.S. Cl. .................................................... 502/304
(58) Field of Classification Search .................. None
See application file for complete search history.

(56) References Cited

U.S. PATENT DOCUMENTS

| | | | |
|---|---|---|---|
| 4,189,404 A | 2/1980 | Keith et al. | |
| 4,335,023 A | 6/1982 | Dettling et al. | |
| 4,714,694 A | 12/1987 | Wan et al. | |
| 4,727,052 A | 2/1988 | Wan et al. | |
| 5,010,051 A | 4/1991 | Rudy | |
| 5,057,483 A | 10/1991 | Wan | |
| 5,147,842 A * | 9/1992 | Funabiki et al. | 502/304 |
| 5,196,390 A * | 3/1993 | Tauster et al. | 502/251 |
| 5,228,335 A | 7/1993 | Clemmens et al. | |
| 5,422,331 A * | 6/1995 | Galligan et al. | 502/333 |
| 5,462,907 A | 10/1995 | Farrauto et al. | |
| 5,597,771 A * | 1/1997 | Hu et al. | 502/304 |

(Continued)

FOREIGN PATENT DOCUMENTS

DE    19522913    1/1996

(Continued)

OTHER PUBLICATIONS

U.S. Appl. No. 09/067,820, filed Apr. 28, 1998 (cumulative with WO 99/55459).

(Continued)

*Primary Examiner*—Melvin C Mayes
*Assistant Examiner*—Stefanie Cohen
(74) *Attorney, Agent, or Firm*—Scott S. Servilla; Diehl Servilla LLC; Melanie L. Brown

(57) ABSTRACT

Provided are methods for manufacturing a base metal undercoat containing catalyst and an exhaust article containing the catalyst. The catalyst contains a base metal undercoat with an oxygen storage component, substantially free of platinum group metal components, and at least one catalytic layer.

25 Claims, 3 Drawing Sheets

U.S. PATENT DOCUMENTS

| | | | |
|---|---|---|---|
| 5,627,124 | A | 5/1997 | Farrauto et al. |
| 5,956,945 | A | 9/1999 | Kumar et al. |
| 5,996,337 | A | 12/1999 | Blosser et al. |
| 6,003,307 | A | 12/1999 | Naber et al. |
| 6,026,639 | A | 2/2000 | Kumar |
| 6,044,644 | A | 4/2000 | Hu et al. |
| 6,052,989 | A | 4/2000 | McCabe et al. |
| 6,087,298 | A * | 7/2000 | Sung et al. .................. 502/333 |
| 6,151,547 | A | 11/2000 | Kumar et al. |
| 6,185,933 | B1 | 2/2001 | Tsuzuki et al. |
| 6,199,373 | B1 | 3/2001 | Hepburn et al. |
| 6,216,448 | B1 | 4/2001 | Schnaibel et al. |
| 6,301,881 | B1 | 10/2001 | Kumar |
| 6,764,665 | B2 | 7/2004 | Deeba et al. |
| 7,276,212 | B2 | 10/2007 | Hu et al. |

FOREIGN PATENT DOCUMENTS

| | | |
|---|---|---|
| EP | 0782880 A1 | 9/1997 |
| JP | 63-256141 A | 10/1988 |
| JP | 02-091440 | 3/1990 |
| JP | 02-198635 A | 8/1990 |
| JP | 09-041954 A | 2/1997 |
| WO | WO-92/09848 | 6/1992 |
| WO | WO-99/55459 | 11/1999 |
| WO | WO-01/12320 | 2/2001 |

OTHER PUBLICATIONS

Final Office Action in U.S. Appl. No. 09/968,192, Apr. 5, 2007, 6 pgs.
Non-Final Office Action in U.S. Appl. No. 09/968,192, Oct. 16, 2006, 7 pgs.
Final Office Action in U.S. Appl. No. 09/968,192, Jan. 3, 2006, 9 pgs.
Non-Final Office Action in U.S. Appl. No. 09/968,192, Apr. 15, 2003, 8 pgs.
Final Office Action in U.S. Appl. No. 11/752,633, May 2, 2008, 9 pgs.
Non-Final Office Action in U.S. Appl. No. 11/752,633, Dec. 14, 2007, 8 pgs.

* cited by examiner

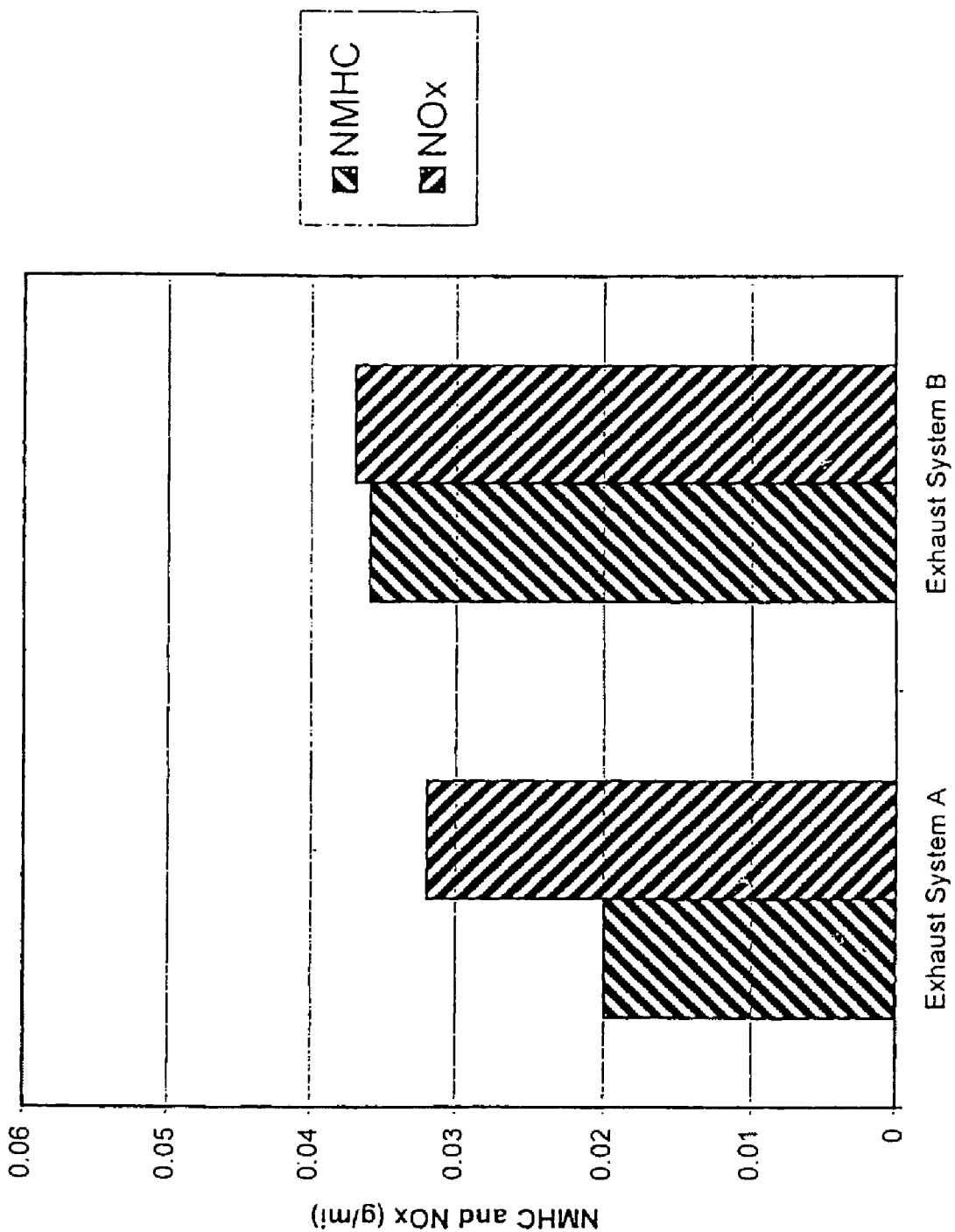

MANUFACTURE OF EXHAUST ARTICLES FOR INTERNAL COMBUSTION ENGINES

This application is a continuation of U.S. application Ser. No. 11/752,633, filed on May 23, 2007, now abandoned, which is a divisional of U.S. application Ser. No. 09/968,192, filed Oct. 1, 2001, now U.S. Pat. No. 7,276,212, issues Oct. 2, 2007, the contents of which are incorporated herein in its entirety.

The present invention relates to exhaust articles and catalysts for the treatment of exhaust gases and methods for their use in on-board diagnostic systems.

Three-way conversion (TWC) catalysts have utility in a number of fields including the treatment of exhaust from internal combustion engines, such as automobile and other gasoline-fueled engines. Emissions standards for unburned hydrocarbons, carbon monoxide and nitrogen oxide contaminants have been set by various governments and must be met, for example, by new automobiles. In order to meet such standards, exhaust articles containing a TWC catalyst are located in the exhaust gas line of internal combustion engines. The TWC catalysts promote the oxidation by oxygen in the exhaust gas of the unburned hydrocarbons and carbon monoxide and the reduction of nitrogen oxides to nitrogen.

Various regulatory agencies require that emission reduction equipment incorporated on a vehicle be continuously monitored by on-board diagnostic (OBD) systems. The function of these OBD systems is to report and set fault codes or alarm signals when the emission control devices no longer meet the mandated emission levels. One of the systems to be monitored is the TWC catalyst used to simultaneously reduce the levels of carbon monoxide, nitrogen oxides, and hydrocarbons in the exhaust gases.

Internal combustion engines produce exhaust gases having compositions that oscillate over time between air/fuel (A/F) ratios that are slightly rich of stoichiometric and ratios that are slightly lean of stoichiometric. Ceria and other oxygen storage components are often included in automotive catalyst compositions to store oxygen when A/F ratios are lean of stoichiometric so that oxygen can be released when A/F ratios become too rich to combust the unburned hydrocarbons and carbon monoxide. TWC catalysts are therefore characterized in one aspect with an oxygen storage capacity (OSC). As the TWC catalyst ages, however, its ability to store oxygen diminishes and the efficiency of the catalytic converter decreases. Based on this fact, current OBDs in use today comprise an exhaust gas oxygen sensor (EGO) placed upstream of the catalyst and an EGO placed downstream of the catalyst to provide some indication of the capability of the catalyst to store oxygen. This provides an estimate of a direct measurement of the oxygen storage capacity of the catalyst. Through calibration, this measurement of an estimate of the oxygen storage capacity of the catalyst can be related to the ability of the catalyst to convert the regulated exhaust gas emissions, i.e., the conversion efficiency of the catalyst. The catalyst deterioration can therefore be monitored.

In particular, a typical method uses EGO sensors that are electrochemical exhaust gas sensors, and their switching characteristics to ultimately monitor catalyst deterioration. The EGO sensor detects whether the exhaust is rich or lean of stoichiometric. The method relies on measuring a ratio of the number of voltage level transitions (switches, e.g., across 0.5 volts) of two EGO sensors, one placed upstream of the catalyst and one placed downstream of the catalyst. Contemporary catalytic converters have a significant oxygen storage capacity (OSC) that dampens out the normal air/fuel cycling used in engine controller strategies. Therefore, the EGO sensor placed upstream of the catalyst (measuring untreated exhaust from the engine) records a switch every time the exhaust gas moves from either a lean-to-rich or rich-to-lean state. The EGO sensor mounted downstream of the catalyst, however, does not record a switch every time the upstream EGO sensor switches, because the OSC of the catalyst acts as an integrator, smoothing out the air/fuel oscillations. As the catalyst deteriorates because of aging, the OSC of the catalyst decreases and therefore the downstream EGO sensor records more switches. By monitoring the downstream EGO sensor and upstream EGO sensor switching transitions for a long period and rationing the number of switching transitions, a parameter referred to as the switch ratio is obtained. This switch ratio is an indicator of the OSC of the catalyst. This switch ratio is then used as a diagnostic parameter for determining the pollutant conversion efficiency of the catalyst.

The amount of OSC that different vehicle manufacturers (OEMs) require for various exhaust platforms is dependent on a number of factors including engine displacement, vehicle type, catalyst volume, catalyst location and engine management and can vary greatly according to the particulars of a vehicle and its associated exhaust platform. Alteration of the OSC of typical catalysts, however, can alter the catalysts' characteristics including their conversion efficiency. An increase or decrease in OSC to meet the OBD monitoring requirement can therefore be a burdensome process that can require multiple trials to finally arrive at the optimum OSC for a given exhaust system without sacrificing or altering catalytic efficiency or performance.

In addition to meeting on board diagnostic monitoring requirements, catalysts preferably meet requirements for efficiently using platinum group metals as catalytic agents due to the high cost of these metals. Strategies that have been used to optimize conversion efficiency with minimized platinum group metal usage include the use of zoned, gradient zoned and layered catalyst composites. Examples of the use of layers is disclosed in U.S. Pat. No. 5,597,771, while the use of zones are described in copending U.S. application Ser. No. 09/067,820 (published as WO 99/55459) and WO 92/09848. Segregation of precious metals, such as platinum group metals, into layers and zones permits more control of the physical and chemical environment in which the individual precious metal components operate in. For example, the catalytic activity of precious metal components are often more effective when in close proximity to certain promoters or other additives. In other instances, to improve hydrocarbon combustion efficiency during cold starts, it is preferable to have high concentrations of certain catalytic agents such as palladium in frontal or upstream zones of the catalyst so that the exhaust gases contact these catalytic agents immediately and combustion of these pollutants can begin at low temperatures, as disclosed in U.S. Pat. No. 6,087,298.

The catalytic layers and zones are formed from washcoat compositions typically containing at least a refractory oxide support such as activated alumina and one or more platinum group metal components (e.g., platinum or palladium, rhodium, ruthenium and iridium). Other additives including promoters and washcoat stabilizers are often added. The washcoat compositions are deposited on a suitable carrier or substrate such as a monolithic carrier comprising a refractory ceramic honeycomb or a metal honeycomb structure, or refractory particles such as spheres or short, extruded segments of a suitable refractory material.

Optimization of a catalyst so that it meets regulatory requirements for minimization of pollutants and durability, as well as an automobile manufacturer's requirements for precious metal usage and oxygen storage capacity for a given vehicle/exhaust platform, often requires extensive experimentation. The experimentation can include iterative reformulation of catalyst compositions and various layer or zone combinations followed by performance testing. It is often the case that the final optimized formulation of one catalyst that successfully meets the requirements of one exhaust platform having a specific OSC requirement, cannot be used for a different exhaust platform having a different OSC requirement without extensive reformulation and performance testing. It would be preferable from the standpoint of both time and expense to have a more adaptable catalyst. Once having optimized a catalyst for catalyst performance and precious metal usage, it would be particularly desirable to be able to alter only the OSC of the catalyst without altering the performance requirements so that it can be used for different exhaust platforms, all having different OSC requirements.

SUMMARY OF THE INVENTION

In one embodiment, the invention relates to an exhaust article having a catalyst, an upstream EGO sensor and a downstream EGO sensor. The catalyst has a base metal undercoat with an oxygen storage component having a concentration that provides a predetermined oxygen storage capacity. The predetermined oxygen storage capacity preferably correlates with the TWC performance of the catalyst. The catalyst also includes at least one catalytic layer.

In some embodiments, the base metal undercoat is disposed on a carrier and the at least one catalytic layer is disposed on the base metal undercoat opposite the carrier, preferably a honeycomb carrier. The oxygen storage component is preferably selected from the group consisting of ceria, praesodymia, and mixtures thereof. Preferably, the oxygen storage component is ceria. In one embodiment, the base metal undercoat is substantially free of platinum group metal components.

In an embodiment, the catalyst of the exhaust article has at least two catalytic layers disposed on top of the base metal undercoat. In another embodiment, the catalyst has at least two catalytic zones. In this zoned catalyst embodiment, the downstream EGO sensor can either be located between the catalytic zones or downstream of all the catalytic zones.

The exhaust article is preferably used for treating exhaust gas from a gasoline engine having an exhaust outlet leading to the catalyst. The exhaust article can contain upstream and downstream conduits. In these embodiments, the catalyst is interposed and in train with the upstream and downstream conduits.

In some embodiments of the exhaust article, the catalyst is located in a close-coupled position, while in other embodiments it is located downstream in an underbody position.

The upstream and downstream EGO sensors used in the exhaust article can be universal EGO sensors or heated EGO sensors. Preferably the EGO sensors in the exhaust article are heated EGO sensors.

Another aspect of the invention relates to an exhaust gas treatment catalyst that contains two catalytic layers in addition to a base metal undercoat. This layered composite catalyst is formed with a base metal undercoat disposed on and adhering to a carrier. The undercoat includes an undercoat oxygen storage component and an undercoat support. The first layer is disposed on the base metal undercoat opposite the carrier and has a platinum component and a first support. The second layer is disposed on the first layer opposite the base metal undercoat, and it contains a rhodium component and a second support. This layered catalyst optionally contains washcoat stabilizers, promoters as well as other additives. The carrier is preferably a honeycomb carrier.

In another embodiment, the invention relates to a multi-zoned layered composite exhaust gas treatment catalyst. The catalyst includes an undercoat disposed on a carrier with an undercoat oxygen storage component and an undercoat support. Preferably, the carrier is a honeycomb carrier. A first catalytic layer is disposed on the base metal undercoat, and a second catalytic layer is disposed on the first layer. Each first and second catalytic layers contain two zones, referred to as upstream and downstream zones. Each of the four catalytic zones contain different platinum group metal formulations. The first upstream zone includes palladium and platinum components, and a refractory oxide support. The first downstream zone has a platinum component and a refractory oxide support. The second upstream zone contains platinum, palladium, and rhodium components, as well as a refractory oxide support. The second downstream zone includes a rhodium component and a refractory oxide support. In exhaust articles of the invention, the multi-zoned layered catalyst is preferably in a close-coupled position.

In another aspect, the invention relates to a method for preparing a catalyst having a base metal undercoat with an oxygen storage component. The method includes the step of determining a concentration of the oxygen storage component in a base metal washcoat composition that provides a predetermined oxygen storage capacity. The predetermined oxygen storage capacity correlates with the TWC performance of the catalyst. The method also includes coating a carrier with the base metal washcoat composition and at least one catalytic washcoat composition.

Another aspect of the invention relates to a method of monitoring the oxygen storage capacity of an exhaust article having a catalyst with a base metal undercoat and at least one catalytic layer. The exhaust article also has an upstream heated exhaust gas oxygen (HEGO) sensor and a downstream HEGO sensor. The method includes: passing an exhaust gas containing unburned hydrocarbons, nitrogen oxides, oxygen and carbon monoxide through the exhaust article; recording a frequency of voltage changes for each of the upstream and downstream HEGO sensors; comparing the recorded frequencies; and sending a fault signal when the recorded frequencies reach a predetermined ratio. Preferably, the predetermined ratio correlates with the TWC performance of the catalyst.

BRIEF DESCRIPTION OF THE DRAWINGS

FIG. 4 is a graph depicting non-methane hydrocarbon (NMHC) and nitrogen oxides (NOx) emissions from an exhaust system of the invention and a comparative example.

DETAILED DESCRIPTION OF THE INVENTION

One aspect of the invention relates to an exhaust article suitable for treating exhaust gases in the exhaust system of an internal combustion engine. In particular, the invention includes exhaust articles with a TWC catalyst having a base metal undercoat containing oxygen storage components, at least one catalytic layer, and exhaust gas oxygen sensors mounted upstream and downstream of the catalyst. The invention also provides a catalyst that is adaptable to a variety of different exhaust platforms.

Figure 1:
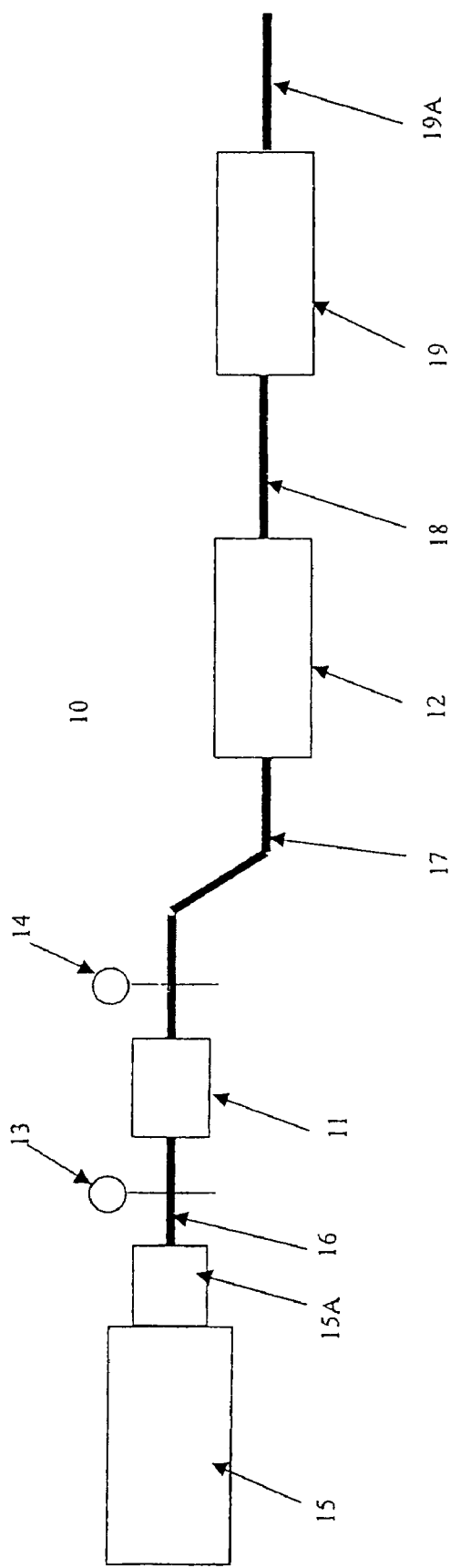
FIG. 1 is a schematic illustration of a motor vehicle exhaust line containing exhaust gas oxygen sensors, a close coupled catalyst, and an underbody catalyst.

One preferred embodiment of the invention is depicted in FIG. 1. A motor vehicle exhaust line (10) includes a close-coupled catalyst (11), an underbody catalyst (12), an upstream exhaust gas oxygen sensor (13), and a downstream exhaust gas oxygen sensor (14). The inventive article can further include a gasoline engine (15). An engine exhaust manifold (15A) is connected through an upstream conduit (16) with the close-coupled catalyst. A downstream conduit (17) connected to the close-coupled catalyst leads to the underbody catalyst (12). The underbody catalyst is typically and preferably connected to a muffler (19) through underfloor exhaust pipe (18). The muffler is connected to a tail pipe (19A) having a tail pipe outlet which opens to the environment.

Typical TWC catalysts are often formed with layers or zones containing oxygen storage components in admixture with catalytically effective amounts of catalytic agents, usually platinum group metals. Applicants have found that by providing a catalyst with (i) a discrete base metal layer containing oxygen storage components with little or no platinum group metal components therein, herein referred to as a base metal undercoat, and (ii) providing at least one separate catalytic layer, a catalyst is produced that has reduced rates of oxygen storage and release relative to catalysts that contain oxygen storage components in only catalytic layers. As a result of the reduced rates of oxygen storage and release, the oxygen storage capacity (OSC) of the catalyst can be adjusted without negatively impacting the catalytic functions of the platinum group metal containing catalytic layers, such as their hydrocarbon oxidation and light-off activities. In addition, the conversion of carbon monoxide and nitrogen oxides are similarly unaffected. The catalysts of the invention are advantageously integrated into a variety of exhaust platforms that have different OSC requirements. The exhaust article includes a catalyst that contains an adjustable oxygen storage capacity in the form of a discrete base metal undercoat.

While not being limited by theory, it is believed that the slower rate of oxygen storage and release in the base metal undercoat has minimal impact on the rate of oxidation of carbon monoxide. The carbon monoxide concentration is thus maintained throughout the catalyst where it can serve as a reductant for the nitrogen oxides. The nitrogen oxide conversion efficiency is therefore maintained. At the same time, the slower rate is still fast enough to efficiently function for on-board diagnosis.

The exhaust articles of the invention are advantageous for any exhaust system including those wherein the measurement of the catalyst's OSC is used to monitor the catalyst's conversion efficiency. This is currently a common method used to monitor catalyst efficiency in, for example, a motor vehicle. Preferably, the exhaust being monitored is from an internal combustion engine, more preferably from a gasoline engine.

It is an advantageous feature of the invention that the amount of oxygen storage capacity in the catalyst of the invention can be conveniently varied to comply with the original equipment manufacturer's (OEM) specification for a given exhaust platform and on-board diagnostic (OBD) system. It is often the case that different vehicle manufacturers specify different OSC requirements for different exhaust platforms and different OBD systems. The quantity of the oxygen storage component in the base metal undercoat has a minimal effect, if any, on the catalyst's performance characteristics such as its three way conversion efficiency, durability and platinum group metal catalytic activities. Thus, adding or reducing the amount of oxygen storage component in the base metal undercoat to comply with the OEM's oxygen storage capacity requirement does not require adjustment of other parameters affecting the catalyst's performance characteristics.

The exhaust article of the invention includes exhaust gas oxygen sensors (EGOs) that are used to determine the amount of oxygen storage capacity of a catalyst. An upstream EGO is placed upstream of a catalyst to measure the oxygen concentration in the exhaust stream from the engine before it contacts the catalyst. As used in this invention then, the catalyst to be monitored is always the first (or upstream) catalyst in the exhaust system (as sensed by an exhaust stream), if more than one catalyst is used. A second, or downstream EGO sensor is then placed downstream of this catalyst to measure the oxygen concentration of the exhaust stream after the exhaust has contacted the catalyst.

In certain embodiments of the invention, the catalyst can include two or more catalytic zones. For example, the catalyst can include an upstream catalytic layer and a downstream catalytic layer. In these embodiments, the downstream EGO sensor can be placed between zones, so long as the upstream EGO sensor is located in front of the catalyst to measure the oxygen concentration from the engine before it contacts the catalyst.

Any exhaust gas oxygen sensor can be used in the invention, including a heated EGO (HEGO) or a universal EGO (UEGO). Both sensor types possess a platinum based coating which combusts residual reductants and oxidants present in the gas stream. The remaining oxygen concentration is determined after substantially all residual gases are combusted. For rich mixtures the sensor detects no residual oxygen. For lean mixtures the oxygen not consumed by the combustion on the platinum electrode surface is detected.

While their use in the invention relates to measuring the OSC capacity of the catalyst, those of ordinary skill in the art will recognize that EGO sensors commonly are also used for controlling engine fueling.

The base metal undercoat can be included without limitation into layered composites that have at least one catalytic layer. There can be more than one catalytic layer, and each catalytic layer can include more than one zone. Moreover, the base metal undercoat can be used in catalysts that also contain pollutant trap zones or layers, e.g., hydrocarbon or NOx trap zones/layers.

The base metal undercoat containing catalysts of the invention are supported on substrates or carriers. Preferably, the base metal undercoat adheres to and is supported directly on the substrate. In other words, the base metal undercoat serves as the bottom most layer. Catalytic layers are disposed on top of the base metal undercoat. Any suitable carrier can be employed, such as a monolithic carrier of the type having a plurality of fine, parallel gas flow passages extending therethrough from an inlet or an outlet face of the carrier, so that the passages are open to fluid flow therethrough (also known as honeycomb carriers). The passages, which are essentially straight from their fluid inlet to their fluid outlet, are defined by walls. The flow passages of the monolithic carrier are thin-walled channels which can be of any suitable cross-sectional shape and size, such as trapezoidal, rectangular, square, sinusoidal, hexagonal, oval or circular. Such structures can contain from about 60 to about 600 or more gas inlet openings ("cells") per square inch of cross section. Carriers can be of the ceramic type or of the metallic type.

The ceramic carrier can be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

An additional advantage of the invention includes providing an improved coating architecture for certain commonly used monoliths. For monoliths containing channels with a rectangular or square shape, the base metal undercoat effectively rounds off the corners thus creating a more effective coating surface for subsequent layers, such as catalytic layers containing platinum group metals as catalytic agents, that are coated on top of the base metal undercoat. A catalytic layer including a platinum group metal catalytic agent, for example, can be adhered directly on the base metal undercoat. The rounded corners prevent the catalyst washcoat from deposition in the corners where it is less accessible for contacting the exhaust gas. Due to the increased accessibility of the catalytic layer to the exhaust gas, a thinner washcoat of the catalytic layer can be used in the catalyst without sacrificing TWC catalyst performance. The thinner catalytic layer is formed from washcoat compositions having lower solids content than catalyst washcoat compositions used in preparing conventional TWC catalysts. This feature significantly reduces platinum group metal use and cost without sacrificing TWC efficiency.

The discrete coats of catalytic material, conventionally referred to as "washcoats", are coated onto the base metal undercoat. By way of example, in one embodiment of the invention, a catalyst of the invention having two catalytic layers would be formed from two discrete washcoats of catalytic material, as depicted by the single channel (20) of the layered catalyst composite depicted in FIG. 2. The base metal undercoat (22) would be coated on the carrier wall (21). The first coat (23) would be adhered to the base metal undercoat (22) and the second coat (24) overlying and adhering to the first coat would be provided in one zone. With this arrangement, the gas being contacted with the catalyst, e.g., being flowed through the passageways of the catalytic material-coated carrier, will first contact the second or top coat and pass therethrough in order to contact the first coat, and then lastly will contact the base metal undercoat. However, in an alternative configuration, the second coat need not overlie the first coat but can be provided in an upstream first zone (as sensed in the direction of gas flow through the catalyst composition) portion of the carrier, with the first coat provided on a downstream second zone portion with both zones supported on the base metal undercoat. In order to apply the washcoat in this configuration, an upstream first zone longitudinal segment only of the carrier (which had been previously coated with a base metal undercoat) would be dipped into a slurry of the second coat catalytic material, and dried, and the downstream second zone longitudinal segment of the carrier would then be dipped into a slurry of the first coat catalytic material and dried.

Base Metal Undercoat

As was mentioned above, the base metal undercoat is preferably adhered directly to the substrate with the catalytic layers disposed on top of the undercoat. The base metal undercoat is formed from a base metal washcoat composition. The composition typically includes at least an oxygen storage component and a refractory oxide support. Other additives such as stabilizers and sulfide suppressants can be optionally included in the base metal washcoat composition.

The oxygen storage component in the undercoat preferably contains at least one oxide of a metal selected from the group consisting of rare earth metals and most preferably a cerium or praseodymium compound with the most preferred oxygen storage component being cerium oxide (ceria). Preferably, the oxygen storage component is in bulk form. By bulk form it is meant that a composition is in a solid, preferably as fine particles which can be as small as 1 to 15 microns in diameter or smaller, as opposed to being dispersed in solution in the base metal washcoat. Preferably, the oxygen storage component is present in at least 10% by weight, more preferably at least 20% by weight of the base metal undercoat composition. Preferably, ceria serves as the base metal undercoat oxygen storage component and comprises between about 70 and 100% by weight of the total undercoat oxygen storage component. When praesodymia is used, it is preferably used in combination with ceria and can amount to up to 20% by weight of the oxygen storage component of the base metal undercoat.

In some embodiments, it is advantageous to incorporate a bulk fine particulate material of co-formed ceria-zirconia composite into the base metal undercoat as an oxygen storage component as described in U.S. Pat. No. 5,057,483. These particles do not react with stabilized alumina washcoat and maintain a BET surface area of above 40 $m^2/g$ upon exposure to 900° C. for a long period of time. Ceria is preferably dispersed homogeneously throughout the zirconia matrix from about 15 to about 85 weight % of the total weight of the ceria-zirconia composite to form a solid solution. The co-formed (e.g. co-precipitated) ceria-zirconia particulate composite can enhance the ceria utility in particles containing ceria-zirconia mixture. The ceria acts as an oxygen storage component and provides the zirconia stabilization. The '483 patent discloses that neodymium and/or yttrium can be added to the ceria-zirconia composite to modify the resultant oxide properties as desired. The rare earth oxide-zirconia composite is preferably present from 0.3 $g/in^3$ to 1.5 $g/in^3$ of the finished base metal undercoat composition.

The amount of oxygen storage component in the base metal undercoat is preferably an amount sufficient so that the catalyst's deterioration in its oxygen storage capacity can be correlated with the deterioration in catalyst's TWC performance. For example, when the catalyst's ability to reduce hydrocarbons, carbon monoxide or nitrogen oxides in the exhaust stream falls below a certain level, there is also an increase in the switching ratio (e.g., downstream EGO/upstream EGO) detected by the OBD system due to the deteriorated oxygen storage capacity. This correlation can therefore be achieved by calibration of the deterioration of the OSC of the catalyst with the deterioration of the TWC performance. The OBD system can then provide a signal to the vehicle operator indicating the need for exhaust system maintenance.

Optionally, the base metal undercoat includes small amounts of a platinum group metal components selected from the group consisting of platinum, palladium, and rhodium. When present, platinum is a preferred platinum group metal component for the base metal undercoat. When present, the amount of precious in the base metal undercoat can be used as a further control of the oxygen storage capacity of the catalyst to particular requirements of a specific exhaust platform and OBD system. For example, by increasing the concentration of the precious metal component in the base metal undercoat, the rate of oxygen storage and release can be significantly increased. The base metal undercoat can have from 0.5 to 10 $g/ft^3$ of a platinum group metal, preferably from 1 to 5 g/ft.

Preferably, the base metal undercoat is substantially free of platinum group metal components. Minor amounts of platinum group metal components can be present as impurities or trace amounts.

The base metal undercoat composition includes an undercoat support formed from a high surface area refractory oxide support. Useful high surface area supports include one or more refractory oxides. These refractory oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxides, e.g., about up to 20 weight percent. Preferably, the activated alumina has a specific surface area of 60 to 300 $m^2/g$.

The base metal undercoat composition optionally can include undercoat alkaline earth metal components to stabilize the undercoat. The undercoat alkaline earth metal components can be selected from the group consisting of magnesium, barium, calcium and strontium, preferably strontium and barium components. The undercoat alkaline earth metal components are preferably alkaline earth metal oxides. Most preferably, the undercoat alkaline earth metal component includes an oxide of barium. Stabilization means that the oxygen storage/discharge efficiency of the catalyst composition of the undercoat is maintained for longer period of time at elevated temperatures. The presence of one or more of the metal oxide thermal stabilizers tends to retard the phase transition of high surface area aluminas such as gamma and eta aluminas to alpha-alumina, which is a low surface area alumina. The alkaline earth metal can be applied in a soluble form which upon calcining becomes the oxide. For example, soluble barium be provided as barium nitrate, barium acetate or barium hydroxide and soluble strontium provided as strontium nitrate or strontium acetate, all of which upon calcining become the oxides.

An undercoat zirconium component can be included in the base metal undercoat to act as a washcoat stabilizer. Preferably, the undercoat zirconium component is zirconium oxide. The zirconium compound can be provided as a water soluble compound such as zirconium acetate or as a relatively insoluble compound such as zirconium hydroxide, both of which upon calcining are converted to the oxide. There should be an amount sufficient to enhance the stabilization of the base metal undercoat composition.

In specific embodiments, the base metal undercoat further contains sulfide suppressants, for instance, undercoat nickel or iron components useful to remove sulfides from the exhaust such as hydrogen sulfides emissions. For example, nickel oxide is a preferred sulfide suppressant. If nickel oxide is used, it is preferably present in the washcoat in an amount from about 1 to 25% by weight in the base metal undercoat. The nickel oxide is preferably provided in the washcoat in bulk form.

The base metal undercoat composition can optionally include undercoat rare earth metal components which are believed to act as stabilizers. The rare earth metal components are derived from a metal selected from the group consisting of lanthanum and neodymium. In a specific embodiment, the first rare earth metal component is substantially lanthana and the second rare earth component is substantially neodymia.

In a typical preparation of the base metal washcoat composition, a mixture of the undercoat support (e.g., activated alumina) and a suitable vehicle, preferably water, is ball-milled for a suitable time to obtain 90% of the particles having a particle size of less than about 20, preferably less than 10 microns. The ball milled composition can be combined with the suitable vehicle in an amount from 30 to 50% solid, preferably from 35 to 45% solid. The mixture is preferably slightly acidic having a pH of from about 3 to about 5. The bulk oxygen storage components and zirconium components, can then be added to the ball mill and milling can be continued to further reduce the particle size of the slurry to from about 5 to about 7 microns. Optionally, premilled sulfide suppressing component, e.g., nickel oxide, can be added at this point with mixing to fully disperse the sulfide suppressing component within the base metal washcoat.

The base metal undercoat can be deposited onto the carrier to form the base metal undercoat by any method known to those of ordinary skill in the art. For example, the base metal washcoat can be prepared and applied to a suitable substrate, preferably a metal or ceramic honeycomb carrier. The base metal washcoat composition can be deposited on the carrier in any desired amount. The amount of the base metal undercoat can be controlled, for example, by adjusting the percent solids of the coating slurry. For example, in one preferred embodiment, a washcoat having from about 32 to 35% solid will result in a concentration of from about 0.8 to about 0.9 $g/in^3$ of the base metal undercoat, when deposited on the monolith carrier.

The undercoat deposited on the carrier is generally formed as a coating over most, if not all, of the surfaces of the carrier contacted. The combined structure can be dried and calcined, preferably at a temperature of at least about 250° C. to fix the soluble additives, e.g., the zirconium component, into the base metal undercoat.

Catalytic Layers or Zones

The base metal undercoat-containing the oxygen storage component can be used with any catalytic layer for preparing a catalyst that can accommodate the oxygen storage requirements of a particular exhaust platform. In some embodiments, there are at least two catalytic layers. In other embodiments, a single catalytic layer can have more than one catalytic zone, with each catalytic zone formed from a discrete catalytic washcoat composition. For instance, a catalytic layer can have an upstream catalytic zone and a downstream catalytic zone. In other embodiments, there can be a plurality of catalytic layers with each layer having multiple catalytic zones, e.g. upstream, downstream, and intermediate zones.

Catalytic layers are formed from catalytic washcoat compositions. Preferred catalytic washcoat compositions contain platinum group metal components as catalytic agents and a support of a refractory metal oxide such as activated alumina. Preferred catalytic washcoat compositions contain oxygen storage components and zirconia components. In addition, each catalytic composition can optionally contain an alkaline earth metal as a stabilizer, an iron or nickel component as a sulfide suppressing agent, and a rare earth metal component selected from the group consisting of lanthanum or neodymium components as a promoter.

Useful catalytic agents include at least one of the platinum group metal components, i.e., palladium, platinum, rhodium, ruthenium, and iridium components, with platinum, palladium and/or rhodium being preferred. Catalytic agents are typically used in amounts of up to 300 $g/ft^3$, and preferably from about 3 to 250 $g/ft^3$ depending on the metal. Amounts of platinum group metal components are based on weight divided by carrier volume, and are typically expressed in grams of material per cubic foot.

As will be apparent to those of ordinary skill in the art, the platinum group metal components, acting as catalytic agents, can exist in the catalyst in multiple oxidation states while in use. By way of example, a palladium component can exist as palladium metal, Pd (II), and Pd(IV) in the catalyst. In a preferred method of preparing the catalyst, a platinum group metal component such as a suitable compound and/or complex of the platinum group metals can be utilized to achieve dispersion of the catalytic component on a support, e.g., activated alumina support particles. As used herein, the term "platinum group metal component" means any platinum group metal compound, complex, or the like which, upon calcination or use of the catalyst decomposes or otherwise converts to a catalytically active form, usually, the metal or the metal oxide. Water soluble compounds or water dispersible compounds or complexes of platinum group metals can be utilized as long as the liquid used to impregnate or deposit the catalytic metal compounds onto support particles does not adversely react with the catalytic metal or its compound or complex or the other components of the catalyst composition and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds of the platinum group metals are preferred. For example, suitable compounds are chloroplatinic acid, amine solubilized platinum hydroxide, palladium nitrate or palladium chloride, rhodium chloride, rhodium nitrate, hexamine rhodium chloride, and the like. During the calcination step, or at least during the initial phase of use of the catalyst, such compounds are converted into a catalytically active form of the platinum group metal or a compound thereof.

Useful catalytic supports can be made of high surface area refractory oxide supports. Useful high surface area supports include one or more refractory oxides selected from alumina, titania, silica and zirconia. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or activated alumina family, such as gamma and eta aluminas, and, if present, a minor amount of other refractory oxide, e.g., about up to 20 weight percent. Preferably, the activated alumina has a specific surface area of 60 to 300 m$^2$/g.

Preferred oxygen storage components in the catalytic composition have oxygen storage and release capabilities. The oxygen storage component is any such material known in the art, preferably at least one oxide of a metal selected from the group consisting of rare earth metals, and most preferably a cerium or praseodymium compound. Cerium oxide and praesodymium oxide are preferred oxygen storage components with cerium oxide (ceria) being most preferred. The oxygen storage component can be present at least 5% by weight and preferably at least 10% by weight and more preferably at least 15% by weight of the catalyst composition.

The oxygen storage component can be included in the catalytic washcoats by dispersing methods known in the art. One method includes impregnation onto the composition by impregnating the oxygen storage component onto the support such as a platinum group metal containing support in the form of an aqueous solution, drying and calcining the resulting mixture in air to give a catalytic layer which that contains an oxide of the oxygen storage component in intimate contact with the catalytic agent. Examples of water soluble or dispersible, decomposable oxygen storage components that can be used include, but are not limited to water soluble salts and/or colloidal dispersions of cerium acetate, praseodymium acetate, cerium nitrate, praseodymium nitrate, etc. U.S. Pat. No. 4,189,404 discloses the impregnation of alumina-based support composition with cerium nitrate.

In another method, the oxygen storage component in the catalytic washcoat composition can be a bulk oxygen storage composition comprising an oxygen storage component which is preferably ceria, and/or praseodymia in bulk form. Ceria is most preferred. A description and the use of such bulk components is presented in U.S. Pat. No. 4,714,694, hereby incorporated by reference. As noted in U.S. Pat. No. 4,727,052, also incorporated by reference, bulk form means that particles of ceria are admixed with particles of activated alumina so that the ceria is present in solid or bulk form as opposed to, for example, impregnating alumina particles with a solution of ceria compound which upon calcination is converted to ceria disposed within the alumina particles.

A preferred bulk oxygen storage component includes a co-precipitated ceria-zirconia composite. The advantages of the particulate ceria-zirconia composite are detailed above in the discussion of the composite in the base metal undercoat composition. There is preferably up to 30 weight percent ceria and at least 70 weight percent zirconia in the oxygen storage component of the base metal undercoat.

Additionally, the catalytic washcoat composition can contain a compound derived from zirconium, preferably zirconium oxide. The zirconium compound can be provided as a water soluble compound such as zirconium acetate or as a relatively insoluble compound such as zirconium hydroxide, both of which upon calcining are converted to the oxide. There should be an amount sufficient to enhance the stabilization and promotion of the catalytic washcoat compositions.

Stabilizers can be included in the catalytic washcoat compositions. Stabilizers can be selected from at least one alkaline earth metal component derived from a metal selected from the group consisting of magnesium, barium, calcium and strontium, preferably strontium and barium. The alkaline earth metal can be applied in a soluble form which, upon calcining, becomes the oxide. It is preferred that the soluble barium be provided as barium nitrate, barium acetate or barium hydroxide and the soluble strontium provided as strontium nitrate or strontium acetate, all of which upon calcining become the oxides. In the catalytic layer compositions, the amount of stabilizer combined with the alumina can be from 0.05 to 30 weight percent, preferably from about 0.1 to 25 weight percent, based on the total weight of the combined alumina, stabilizer and platinum group metal component.

The catalytic washcoat compositions optionally contain at least one promoter selected from the group consisting of lanthanum metal components and neodymium metal components with the preferred components being lanthanum oxide (lanthana) and neodymium oxide (neodymia). While these compounds are known to act as stabilizers for the alumina support, their primary purpose in the compositions of the present invention is to act as reaction promoters. A promoter is considered to be a material which enhances the conversion of a desired chemical to another. In a TWC catalyst the promoter enhances the catalytic conversion of carbon monoxide and hydrocarbons into water and carbon dioxide and nitrogen oxides into nitrogen and oxygen.

The lanthanum and/or neodymium components are preferably formed from precursors, such as soluble salts including acetates, halides, nitrates, sulfates and the like. The solution of the soluble promoters are preferably used to impregnate the solid components for their conversion to oxides after calcination. Preferably, the promoter is in intimate contact with other components in the composition including and in particular, the platinum group metal component.

The catalytic layer compositions of the present invention can contain other conventional additives such as sulfide suppressants, e.g., nickel or iron components. Nickel oxide is a preferred sulfide suppressant and if used is present in an amount from about 1 to 25% by weight of the base metal undercoat.

The catalytic washcoats of the present invention can be made by any suitable method. One preferred method includes preparing a mixture of at least one water-soluble or dispersible, platinum group metal component and a finely-divided, high surface area, refractory oxide which is sufficiently dry to absorb essentially all of the solution to form a supported platinum group metal component. If more than one platinum group metal component is used in the catalytic washcoat composition, the additional platinum group metal component(s), can be supported on the same or different refractory oxide particles as the first platinum group metal component.

The supported platinum group metal component or plurality of such supported platinum group metal components are then added to water along with other additives, and comminuted by a ball mill or other suitable equipment to form a slurry. Preferably, the slurry is acidic, having a pH of less than 7 and preferably from 3 to 7. The pH is preferably lowered by the addition of an acid, preferably acetic acid to the slurry. In preferred embodiments, the catalytic washcoat slurry is comminuted to result in substantially all of the solids having particle sizes of less than 10 or 15 micrometers in average diameter. At this point, stabilizing components such as barium and strontium acetate, and promoting components including lanthanum acetate can be added and the composition is milled further. The catalytic washcoat slurry can be formed into a catalytic layer on the base metal undercoat, previously coated on a carrier (or on a previously applied catalytic layer), and dried. The platinum group components and as well additives provided in soluble form, e.g., oxygen storage components, zirconium components and promoters, in the catalytic layer are converted to a water insoluble form chemically or by calcining. The catalytic layers are preferably calcined, preferably at temperatures of at least 250° C.

Alternatively, each upstream layer of the present composite can also be prepared by the method disclosed in U.S. Pat. No. 4,134,860 (incorporated by reference) generally recited as follows.

A finely-divided, high surface area, refractory oxide support is contacted with a solution of a water-soluble, platinum group metal component to provide a mixture which is essentially devoid of free or unabsorbed liquid. The platinum group metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the platinum group metal component, i.e., the amounts of the solution and the support, as well as the moisture content of the latter, are such that their mixture has an essential absence of free or unabsorbed solution when the addition of the platinum group metal component is complete. During the latter conversion or fixing of the catalytically-promoting metal component on the support, the composite remains essentially dry, i.e., it has substantially no separate or free liquid phase.

The mixture containing the fixed, platinum group metal component can be comminuted as a slurry which is preferably acidic, to provide solid particles that are advantageously primarily of a size of up to about 5 to 15 microns. The resulting washcoat slurry is preferably deposited on a base metal undercoat which has been coated on a carrier or on a previously applied catalytic layer. The composite is then dried and can be calcined. When more than one catalytic washcoat is applied, each washcoat can be succeedingly applied and calcined to form layered composites of the present invention. In order to deposit a plurality of catalytic washcoat slurries on a macro sized carrier, one or more comminuted slurries are applied to the base metal undercoat in any desired manner. Thus, the base metal coated carrier can be dipped one or more times in the catalytic washcoat slurry, with intermediate drying if desired, until the appropriate amount of slurry is on the carrier. The slurry employed in depositing the supported platinum group metal component-high area support composite on the carrier will often contain about 20 to 60 weight percent of finely-divided solids, preferably about 25 to 55 weight percent. Preferred methods for preparing zone-coated carriers are described in copending U.S. application Ser. No. 09/067,820 (published as WO99/55459), filed Apr. 28, 1998, the disclosure of which is herein incorporated by reference.

Layered Composite Catalyst with Two Catalytic Layers

A particularly preferred catalyst of the invention includes a layered composite having first and second catalytic layers disposed on top of a base metal undercoat. As can be seen in a channel (20) of the catalyst depicted in FIG. 2, this catalyst has a base metal undercoat (22) adhered to the carrier wall (21), preferably of a monolith carrier, a first layer (23) on top of and adhering to the base metal undercoat (opposite the carrier wall) and a second layer (24) overlying and adhering to the first layer. This preferred catalyst can be located in a close-coupled position or alternatively, in an underbody position.

This layered catalyst contains a carrier, preferably a honeycomb carrier coated with a base metal undercoat having an undercoat oxygen storage component and an undercoat support. The undercoat oxygen storage component preferably is formed at least in part from ceria. The first layer contains a platinum component and the second layer contains a rhodium component. The catalytic layers also contain first and second supports, respectively.

In this layered catalyst, the base metal undercoat preferably contains:

from about 0.2 g/in$^3$ to about 2.0 g/in$^3$ of an undercoat support comprising activated alumina;

from about 0.1 g/in$^3$ to about 2.0 g/in$^3$ of an undercoat ceria-zirconia composite.

The base metal undercoat optionally contains:

from about 0.01 g/in$^3$ to about 0.20 g/in$^3$ of an undercoat zirconium component; and from about 0.025 g/in$^3$ to about 0.7 g/in$^3$ of an undercoat nickel component.

The first layer preferably contains:

from 1 to about 100 g/ft$^3$ of a first platinum component; and from about 0.2 g/in$^3$ to about 2.0 g/in$^3$ of a first support comprising activated alumina.

The first layer optionally contains:

from about 0.025 to about 2.0 g/in$^3$ of a first ceria-zirconia composite;

from about 0.01 to about 0.2 g/in$^3$ of a first zirconium component; and from about 0.025 to about 0.3 g/in$^3$ of at least one first alkaline earth metal component comprising a first barium component.

The second layer preferably contains:
   from about 2 g/ft³ to about 20 g/ft³ of a second rhodium component; and
   from about 0.2 g/in³ to about 2.0 g/in³ of a second support comprising activated alumina;

The second layer optionally contains:
   from about 0.025 to about 1.5 g/in³ of a second ceria-zirconia composite; and
   from about 0.01 to about 0.20 g/in³ of a second zirconium component.

Multi-Zoned Layered Composite

Another preferred catalyst of the invention is a multi-zoned layered composite. As is shown in a channel (30) of this catalyst depicted FIG. 3, this catalyst has a base metal undercoat (32) overlying and adhering to the carrier wall (31), preferably of a honeycomb carrier, a first layer on top of and adhering to the base metal undercoat, and a second layer overlying and adhering to the first layer (opposite the base metal undercoat). Each first and second catalytic layer contains two zones, an upstream and a downstream zone. The second upstream zone (35) overlies and adheres to the first upstream zone (33) (opposite the base metal undercoat) and the second downstream zone (36) overlies and adheres to the first downstream zone (34). Each of the first upstream, second upstream, first upstream, and second downstream zones are catalytic zones.

The base metal undercoat of the multi-zoned layered catalyst has an undercoat oxygen storage component and an undercoat support. The first upstream zone contains a first upstream platinum component, a first upstream palladium component, and a first upstream support. The first downstream zone has a first downstream platinum component and a first downstream support. The second upstream zone includes a second upstream platinum component, a second upstream palladium component, a second upstream rhodium component, and a second upstream support. The second downstream zone has a second downstream rhodium component and a second downstream support.

In the multi-zoned layered catalyst, the base metal undercoat preferably has:
   from about 0.1 g/in³ to about 2.0 g/in³ of an undercoat support;
   from about 0.1 to about 2.0 g/in³ of an undercoat ceria-zirconia composite; and The base metal undercoat optionally contains from about 0.01 to about 0.20 g/in³ of the undercoat zirconium component.

The first upstream zone contains:
   from 1 to about 100 g/ft³ of a first upstream platinum component;
   from 1 to about 200 g/ft³ of a first upstream palladium component; and
   from about 0.2 g/in³ to about 2.0 g/in³ of a first upstream support.

The first upstream zone optionally contains:
   from 0.025 to about 1.5 g/in³ of a first upstream ceria-zirconia composite;
   from 0.01 to about 0.2 g/in³ of a first upstream zirconium component;
   from 0.01 to about 0.3 g/in³ of a first upstream alkaline earth metal component comprising a first upstream barium component;
   from 0.025 to about 0.3 g/in³ of a first upstream strontium component; and
   from about 0.01 about 0.3 g/in³ of a first upstream rare earth metal component comprising a lanthanum component.

The first downstream zone has:
   from about 1 g/ft³ to about 100 g/ft³ of a first downstream platinum component; and
   from about 0.2 g/in³ to about 2.0 g/in³ of a first downstream support.

The first downstream zone optionally contains:
   from about 0.025 g/in³ to about 1.5 g/in³ of a first downstream ceria-zirconia composite;
   from about 0.01 g/in³ to about 0.2 g/in³ of a first downstream zirconium component; and
   from about 0.01 g/in³ to about 0.3 g/in³ of a first downstream alkaline earth metal component comprising a first downstream barium component.

The second upstream zone contains:
   from about 1.0 g/ft³ to about 100 g/ft³ of a second upstream platinum component;
   from about 1.0 g/ft³ to about 200 g/ft³ of a second upstream palladium component;
   from about 1.0 g/ft³ to about 100 g/ft³ of a second upstream rhodium component; and
   from about 0.2 g/in³ to about 2.0 g/in³ of a second upstream support.

The second upstream zone optionally contains:
   from about 0.025 g/in³ to about 1.5 g/in³ of a second upstream ceria-zirconia composite;
   from about 0.01 g/in³ to about 0.2 g/in³ of a second upstream zirconium component; and
   from about 0.01 g/in³ to about 0.3 g/in³ of a second upstream barium component.

The second downstream zone contains:
   from about 1.0 g/ft³ to about 20 g/ft³ of a second downstream rhodium component; and
   from about 0.1 g/in³ to about 2.0 g/in³ of a second downstream support.

The second downstream zone optionally contains:
   from about 0.025 g/in³ to about 1.5 g/in³ of a second downstream ceria-zirconia composite; and
   from about 0.01 g/in³ to about 0.2 g/in³ of a second downstream zirconium component.

The above-described multi-zoned layered catalyst composite of the invention is sufficiently effective to eliminate a significant amount of pollutants at low temperature while at the same time being stable over long periods of engine operation. These properties make this preferred catalyst particularly useful as a stable close-coupled catalyst. Close-coupled catalysts are placed close to an engine to enable them to reach reaction temperatures as soon as possible. Preferably the close-coupled catalyst is placed within one foot of the engine, more preferably less than six inches. Close-coupled catalysts are often attached directly to the exhaust gas manifold. Close-coupled catalysts are designed to reduce hydrocarbon emissions from gasoline engines during cold starts. More particularly, close-coupled catalyst are designed to reduce pollutants in automotive engine exhaust gas streams at temperatures as low as 350° C., preferably as low as 300° C. and more preferably as low as 200° C. Due to their close proximity to the engine, close-coupled catalysts are preferably stable at high temperatures, e.g., up to 1100° C., during the operating life of the engine. Methods of using close-coupled catalysts are described in U.S. Pat. No. 6,044,644, herein incorporated by reference.

One preferred exhaust article of the invention has a multi-zone three-layered catalyst composite of the type described above as a close-coupled catalyst and a downstream underbody catalyst comprising the earlier described layered composite catalyst (Pt/Rh). The upstream EGO sensor in this particular configuration can be mounted upstream of the first catalyst (the multizone three-layer catalyst composite) to measure the A/F perturbation from the engine outlet and the downstream EGO can be placed downstream of the first catalyst and upstream of the second catalyst.

The following examples further illustrate the present invention, but of course, should not be construed as in any way limiting its scope.

Example 1

Comparative Nonmethane Hydrocarbon and Nitrogen Oxide Abatement Performance

Exhaust System A

Figure 2:
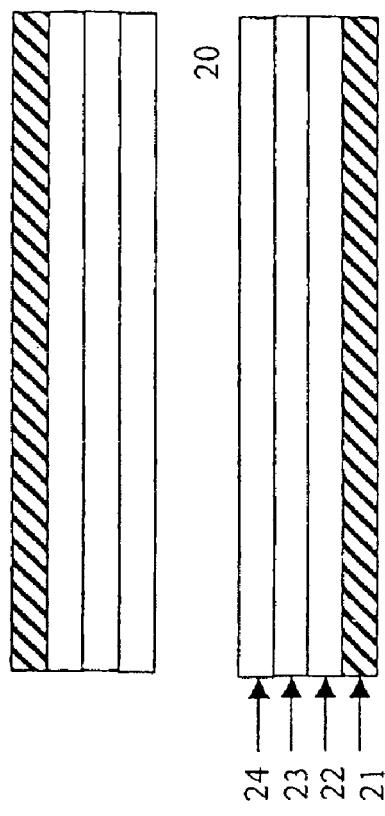
FIGS. 2 and 3 are schematic diagrams illustrating various example substrate designs of the present invention.
Figure 3:
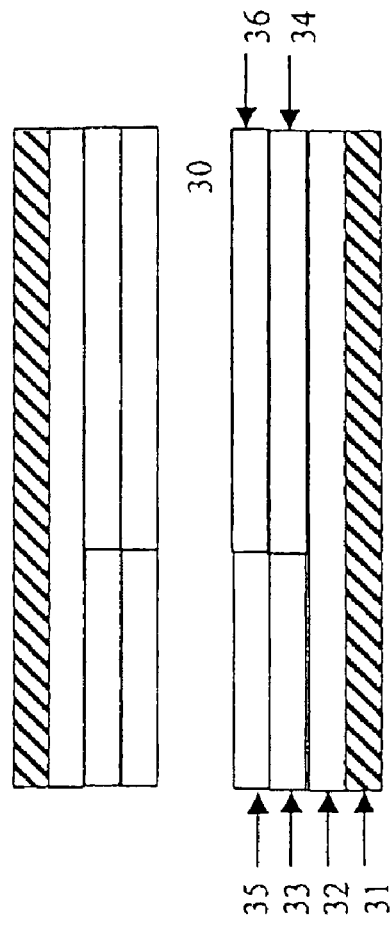

Exhaust system A contained two catalysts of the invention including a preferred multi-zoned layered catalyst (as seen in FIG. 3) having a base metal undercoat as a close-coupled catalyst and a preferred layered catalyst (also with a base metal undercoat) as a downstream underbody catalyst (as seen in FIG. 2).

The close-coupled catalyst was prepared by coating an oval-shaped cordierite honeycomb carrier having a total volume of 55 in$^3$ [dimensions 3.15 in (X)×4.75 (Y)×4.3 in (Z)] according to the methods described above. The upstream section of the carrier had a volume of 19.2 in$^3$. The upstream section contained a formulation having a ratio of Pt/Pd/Rh of 1:20:1 with a total platinum group metal loading of 110 g/ft$^3$. The first upstream zone (supported on the base metal undercoat) with a washcoat loading of 1.27 g/in$^3$ contained platinum and palladium components. The second upstream zone (disposed on the first upstream zone) with a washcoat loading of 0.84 g/in$^3$ contained platinum, palladium and rhodium components. The downstream section of the carrier had a volume of 35.8 in$^3$. The downstream section contained a formulation having a ratio of Pt/Pd/Rh of 4:0:1 with a total platinum group metal loading of 25 g/ft$^3$. The first downstream zone (supported on the base metal undercoat) with a washcoat loading of 0.82 g/in$^3$ contained a platinum component. The second downstream zone (disposed on the first downstream zone) with a washcoat loading of 0.43 g/in$^3$ contained a rhodium component.

The layered underbody catalyst of exhaust system A contained a base metal undercoat, a first catalytic layer (deposited on the base metal undercoat) and a second catalytic layer (deposited on the first layer). The catalysts were prepared by coating an oval-shaped cordierite honeycomb carrier having a total volume of 100 in$^3$ [dimensions 3.15 in (X)×5.79 (Y)× 3.15 in (Z)]. The layered catalyst contained a formulation having a ratio of Pt/Pd/Rh of 3:0:2 with a total platinum group metal loading of 12 g/ft$^3$. The first layer with a washcoat loading of 1.07 g/in$^3$ contained a platinum component and the second layer with a washcoat loading of 0.68 g/in$^3$ contained a rhodium component.

Exhaust System B

Comparative exhaust system B contained a close-coupled catalyst having two catalytic layers and a downstream underbody catalyst also having two catalytic layers. Neither the close-coupled catalyst nor the downstream underbody catalyst in system B contained a base metal undercoat.

The close coupled catalyst of system B was prepared by coating the same 55 g/in$^3$ oval-shaped cordierite honeycomb carrier as was used above for the close-coupled catalyst in exhaust system A. The close-coupled catalyst contained a formulation having a ratio of Pt/Pd/Rh of 1:28:1 with a total platinum group metal loading of 212 g/ft$^3$. The first layer (coated on the carrier) with a washcoat loading of 2.01 g/in$^3$ contained platinum and palladium components, and the second layer (coated on top of the first layer) with a washcoat loading of 1.74 g/in$^3$ contained platinum, palladium and rhodium components.

The underbody catalyst of exhaust system B was prepared by coating the same 100 in$^3$ oval-shaped cordierite honeycomb carrier as was used above for the underbody catalyst in exhaust system A. The underbody catalyst contained a formulation having a ratio of Pt/Pd/Rh of 5:0:1 with a total platinum group metal loading of 34 g/ft$^3$. The first layer (coated on the carrier) with a washcoat loading of 2.14 g/in$^3$ contained a platinum component, and the second layer (coated on top of the first layer) with a washcoat loading of 1.18 g/in$^3$ contained a rhodium component.

Performance:

Comparative catalyst performance was evaluated according to the Federal Test Procedure (FTP) 1975 after 50K aging. The exhaust system containing the catalysts was evaluated using a 4.6 liter engine vehicle after 50 k equivalent aging according to the Federal Test Procedure (FTP) 1975.

As seen in FIG. 4, the exhaust system B (containing catalysts without a base metal undercoat) reduced non-methane hydrocarbons (NMHC) to levels of about 0.03 g/mi, while the nitrogen oxide (NOx) pollutants were reduced to 0.036 g/mi. Exhaust System A of the invention shows comparable or better performance with NMHC levels of about 0.032 g/mi and NOx emissions of about 0.02 g/mi. Exhaust system A achieves the NMHC and NOx emission reduction with lower total platinum group metal loading than those of Exhaust System B. Specifically, the close-coupled catalyst of Exhaust System A has a total platinum group metal loading of 110+ 25=135 g/ft$^3$ while the close-coupled catalyst of Exhaust System B has a significantly greater platinum group loading of 212 g/ft$^3$. In addition, the underbody catalyst of Exhaust System A has total platinum group metal loading of 12 g/ft$^3$ while the underbody catalyst of Exhaust System B has a total loading of 34 g/ft$^3$.

Example 2

Performance of a Multi-Zoned Layered Catalyst of the Invention with Differing Concentrations of Undercoat Oxygen Storage Component Multi-zoned layered catalyst as described for the close-coupled catalyst of Exhaust System A of Example 1 were prepared. One catalyst A1 contained a base metal undercoat with a ceria-zirconia composite of 35% by weight ceria and a loading of 0.5 g/in$^3$. A second catalyst A2 contained a base metal undercoat with a ceria-zirconia composite of 45% by weight ceria and a loading of 1.0 g/in$^3$ (i.e., the ceria was increased by 80% in catalyst A2). After 50 k equivalent aging, the total hydrocarbon (THC) and NOx were evaluated using the FTP 1975 with a 4.6 L engine vehicle. The THC and NOx collected in each bag is displayed in Table 1.

TABLE 1

|  | THC A1 | THC A2 | NOx A1 | NOx A2 |
|---|---|---|---|---|
| Bag 1 | 0.16 | 0.151 | 0.071 | 0.074 |
| Bag 2 | 0.012 | 0.011 | 0.003 | 0.002 |
| Bag 3 | 0.026 | 0.027 | 0.023 | 0.045 |
| FTP | 0.046 | 0.044 | 0.024 | 0.029 |

The data obtained for the two catalysts with different oxygen storage capacities in the undercoat shows similar performance in the abatement of THC and NOx.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A method for preparing a catalyst having a base metal undercoat with an oxygen storage component, the method comprising:
    coating a carrier with the base metal washcoat composition comprising an undercoat support, substantially free of platinum group metal components, and having an undercoat oxygen storage component selected from the group consisting of ceria and praseodymia that provides oxygen storage capacity; and
    coating the base metal undercoat with a first catalytic washcoat layer containing a first platinum group metal component and a first support.

2. The method of claim 1, further comprising coating the first catalytic washcoat layer with a second catalytic washcoat layer disposed on the first layer opposite the base metal undercoat, the second layer comprising a second platinum group metal component and a second support.

3. The method of claim 2, wherein the first platinum group metal component comprises platinum and the second platinum group metal component comprises rhodium.

4. The method of claim 3, wherein the undercoat support, the first support, and the second support comprise activated alumina.

5. The method of claim 3, wherein there is from about 0.2 g/in$^3$ to about 2.0 g/in$^3$ of the undercoat support comprising activated alumina; and the undercoat oxygen storage component comprises an undercoat ceria-zirconia composite and there is from about 0.1 g/in$^3$ to 2.0 g/in$^3$ of the undercoat ceria-zirconia composite.

6. The method of claim 5, wherein the base metal undercoat further comprises:
    an undercoat zirconium component; and
    an undercoat nickel component; and
    wherein the first catalytic layer further comprises:
        a first ceria-zirconia composite;
        a first zirconium component; and
        at least one first alkaline earth metal component; and
    wherein the second catalytic layer further comprises:
        a second ceria-zirconia composite; and
        a second zirconium component.

7. The method of claim 6, wherein there is from about 0.025 g/in$^3$ to about 0.7 g/in$^3$ of the undercoat nickel component; and there is from about 0.01 g/in$^3$ to about 0.20 g/in$^3$ of the undercoat zirconium component.

8. The method of claim 6, wherein the first alkaline earth metal component is selected from the group consisting of strontium, barium, calcium and magnesium components.

9. The method of claim 1, wherein the catalyst is a TWC catalyst having TWC performance, and the amount of the undercoat oxygen storage component in the base metal undercoat is sufficient so that the catalyst's deterioration in its oxygen storage capacity can be correlated with the deterioration in the catalyst's TWC performance.

10. The method of claim 6, wherein
    there is from about 1 g/ft$^3$ to about 100 g/ft$^3$ of the first platinum component;
    there is from about 2 g/ft$^3$ to about 20 g/ft$^3$ of the second rhodium component;
    there is from about 0.2 g/in$^3$ to about 2.0 g/in$^3$ of the undercoat support comprising activated alumina;
    there is from about 0.2 g/in$^3$ to about 2.0 g/in$^3$ of the first support comprising activated alumina;
    there is from about 0.2 g/in$^3$ to about 2.0 g/in$^3$ of the second support comprising activated alumina;
    there is from about 0.1 g/in$^3$ to about 2.0 g/in$^3$ of the undercoat ceria-zirconia composite;
    there is from about 0.025 g/in$^3$ to about 2.0 g/in$^3$ of the first ceria-zirconia composite;
    there is from about 0.025 g/in$^3$ to about 1.5 g/in$^3$ of the second ceria-zirconia composite;
    there is from about 0.01 g/in$^3$ to about 0.20 g/in$^3$ of the undercoat zirconium component;
    there is from about 0.01 g/in$^3$ to about 0.20 g/in$^3$ of the first zirconium component;
    there is from about 0.01 g/in$^3$ to about 0.20 g/in$^3$ of the second zirconium component;
    there is from about 0.025 g/in$^3$ to about 0.7 g/in$^3$ of the undercoat nickel component; and
    there is from about 0.025 g/in$^3$ to about 0.3 g/in$^3$ of the at least one first alkaline earth metal component comprising a first barium component.

11. The method of claim 1, wherein the carrier is a honeycomb carrier.

12. The method of claim 1, further comprising locating the catalyst in an underbody position.

13. The method of claim 1, further comprising locating the catalyst in a close-coupled position.

14. A method for preparing a catalyst having a base metal undercoat with an oxygen storage component, the method comprising:
    coating a carrier with the base metal washcoat composition comprising an undercoat support, substantially free of platinum group metal components, and having an undercoat oxygen storage component selected from the group consisting of ceria and praseodymia that provides oxygen storage capacity;
    coating a first upstream zone of the base metal undercoat with a first upstream catalytic washcoat layer containing a first upstream platinum group metal component and a first upstream support; and
    coating a first downstream zone of the base metal undercoat with a first downstream catalytic washcoat layer containing a first downstream platinum group metal component and a first downstream support.

15. The method of claim 14, further comprising coating the first upstream catalytic washcoat layer with a second upstream catalytic washcoat layer disposed on the first upstream catalytic washcoat layer opposite the base metal undercoat, the second upstream layer comprising a second upstream platinum group metal component and a second upstream support; and coating the first downstream catalytic washcoat layer with a second downstream catalytic washcoat layer disposed on the first downstream catalytic washcoat layer opposite the base metal undercoat, the second downstream layer comprising a second downstream platinum group metal component and a second downstream support.

16. The method of claim 15, wherein the first upstream platinum group metal component comprises platinum and palladium, the first downstream platinum group metal component comprises platinum, the second upstream platinum metal component comprises platinum, palladium and rhodium, and the second downstream platinum metal component comprises rhodium.

17. The method of claim 16, wherein the undercoat support, first upstream support, first downstream support, second upstream support, and second downstream support each comprise activated alumina.

18. The method of claim 16, wherein there is from about 0.1 $g/in^3$ to about 2.0 $g/in^3$ of the undercoat support; and the undercoat oxygen storage component comprises an undercoat ceria-zirconia composite and there is from about 0.1 $g/in^3$ to about 2.0 $g/in^3$ of the undercoat ceria-zirconia composite.

19. The method of claim 18, wherein the first upstream zone further comprises:
 a first upstream ceria-zirconia composite;
 a first upstream zirconium component;
 at least one first upstream alkaline earth metal component; and
 at least one first upstream rare earth metal component selected from the group consisting of lanthanum and neodymium components; and
wherein the first downstream zone further comprises:
 a first downstream ceria-zirconia composite;
 a first downstream zirconium component; and
 a first downstream alkaline earth metal component; and
wherein the second upstream zone further comprises:
 a second upstream ceria-zirconia composite;
 a second upstream zirconium component; and
 at least one second upstream alkaline earth metal component; and
wherein the second downstream zone further comprises:
 a second downstream ceria-zirconia composite; and
 a second downstream zirconium component.

20. The method of claim 18, further comprising about 0.01 $g/in^3$ to about 0.20 $g/in^3$ of an undercoat zirconium component.

21. The method of claim 19, wherein the first upstream, first downstream and second upstream alkaline earth metal components are each selected from the group consisting of strontium, barium, calcium and magnesium components.

22. The method of claim 14, wherein the TWC catalyst has TWC performance, and the amount of the undercoat oxygen storage component in the base metal undercoat is sufficient so that the catalyst's deterioration in its oxygen storage capacity can be correlated with the deterioration in the catalyst's TWC performance.

23. The method of claim 19, wherein:
 there is from about 1 $g/ft^3$ to about 100 $g/ft^3$ of the first upstream platinum component;
 there is from about 1 $g/ft^3$ to about 200 $g/ft^3$ of the first upstream palladium component;
 there is from about 1 $g/ft^3$ to about 100 $g/ft^3$ of the first downstream platinum component;
 there is from about 1 $g/ft^3$ to about 100 $g/ft^3$ of the second upstream platinum component;
 there is from about 1 $g/ft^3$ to about 200 $g/ft^3$ of the second upstream palladium component;
 there is from about 1 $g/ft^3$ to about 100 $g/ft^3$ of the second upstream rhodium component;
 there is from about 1 $g/ft^3$ to about 20 $g/ft^3$ of the second downstream rhodium component;
 there is from about 0.1 $g/in^3$ to about 2.0 $g/in^3$ of the undercoat support;
 there is from about 0.2 $g/in^3$ to about 2.0 $g/in^3$ of the first upstream support;
 there is from about 0.2 $g/in^3$ to about 2.0 $g/in^3$ of the first downstream support;
 there is from about 0.2 $g/in^3$ to about 2.0 $g/in^3$ of the second upstream support;
 there is from about 0.1 $g/in^3$ to about 2.0 $g/in^3$ of the second downstream support;
 there is from about 0.1 $g/in^3$ to about 2.0 $g/in^3$ of the undercoat ceria-zirconia composite;
 there is from about 0.025 $g/in^3$ to about 1.5 $g/in^3$ of the first upstream ceria-zirconia composite;
 there is from about 0.025 $g/in^3$ to about 1.5 $g/in^3$ of the first downstream ceria-zirconia composite;
 there is from about 0.025 $g/in^3$ to about 1.5 $g/in^3$ of the second upstream ceria-zirconia composite;
 there is from about 0.025 $g/in^3$ to about 1.5 $g/in^3$ of the second downstream ceria-zirconia composite;
 there is from about 0.01 $g/in^3$ to about 0.20 $g/in^3$ of an undercoat zirconium component;
 there is from about 0.01 $g/in^3$ to about 0.20 $g/in^3$ of the first upstream zirconium component;
 there is from about 0.01 $g/in^3$ to about 0.20 $g/in^3$ of the first downstream zirconium component;
 there is from about 0.01 $g/in^3$ to about 0.20 $g/in^3$ of the second upstream zirconium component; and
 there is from about 0.01 $g/in^3$ to about 0.20 $g/in^3$ of the second downstream zirconium component;
 there is from about 0.01 $g/in^3$ to about 0.30 $g/in^3$ of the first upstream alkaline earth metal component comprising a first upstream barium component;
 there is from about 0.025 $g/in^3$ to about 0.3 $g/in^3$ of a first upstream strontium component;
 there is from about 0.025 $g/in^3$ to about 0.3 $g/in^3$ of the first downstream alkaline earth metal component comprising a first downstream barium component;
 there is from about 0.025 $g/in^3$ to about 0.3 $g/in^3$ of the second upstream alkaline earth metal component comprising a second upstream barium component; and
 there is from about 0.01 $g/in^3$ to about 0.3 $g/in^3$ of the first upstream rare earth metal component comprising a first upstream lanthanum component.

24. The method of claim 14, wherein the carrier is a honeycomb carrier.

25. The method of claim 14, further comprising locating the catalyst in a close-coupled position.

* * * * *